May 22, 1951  T. G. SHIPLEY  2,553,947

WELDING JIG FOR CAR UNDERFRAMES

Filed May 11, 1948

*INVENTOR.*
TOLBOTT G. SHIPLEY
BY
*George R. Ericson*
ATTORNEY

Patented May 22, 1951

2,553,947

UNITED STATES PATENT OFFICE 2,553,947

WELDING JIG FOR CAR UNDERFRAMES

Tolbott G. Shipley, St. Louis, Mo., assignor to American Car and Foundry Company, New York, N. Y., a corporation of New Jersey Application May 11, 1948, Serial No. 26,363

2 Claims. (Cl. 113—99)

This invention relates to apparatus for assembling railway car underframes and particularly to apparatus for temporarily securing underframe members to an assembly jig during welding of the underframe.

In present practice it is conventional to assemble the various members which comprise the underframe of a railway freight car on an assembly jig. The method of assembling the underframe consists of setting up the completed center sill on the jig, securing the bolsters, crossbearers and crossties to the center sill by welding and securing side sill connectors and reinforcement channels to the ends of the bolsters, crossties and crossbearers, respectively. The function of the side sill connectors is to provide a support and connecting means for the car sidewall, which in the completed car rests upon and is secured to the upper horizontal surface of the side sill connectors. The function of the side sill reinforcements is dual, first to provide additional support for the side sill and second to reinforce the sidewall of the car at its weakest point, namely, at the door opening. It is obvious from the very nature of the functions performed by these members that their upper surfaces must all lie in the same horizontal plane and that their outwardly facing surfaces should all lie in the same vertical plane, parallel to the direction of the center sill.

An object of this invention is to provide a simple yet effective jig for holding the side sill connectors and the side sill reinforcement members in the correct position with relation to the transverse members of the car underframe for welding thereto.

Another object is to provide a clamp of this character capable of being easily displaced from operating position with relation to the main body of the jig to permit insertion of the component parts of the underframe and removal of the completed underframe from the jig. The feature is important, because the underframe expands due to the heat of welding, and the expansion would preclude removal from a jig having fixed clamping elements until the underframe cooled and contracted sufficiently to permit withdrawal. Such delay would, of course, reduce considerably the number of underframes which a jig could accommodate during a given period of time, and would make the construction of additional jigs imperative to speed the assembly of underframes.

Other objects and advantages of the invention will be clearly apparent upon reading the following specification in connection with the drawings, in which.

Figure 1:
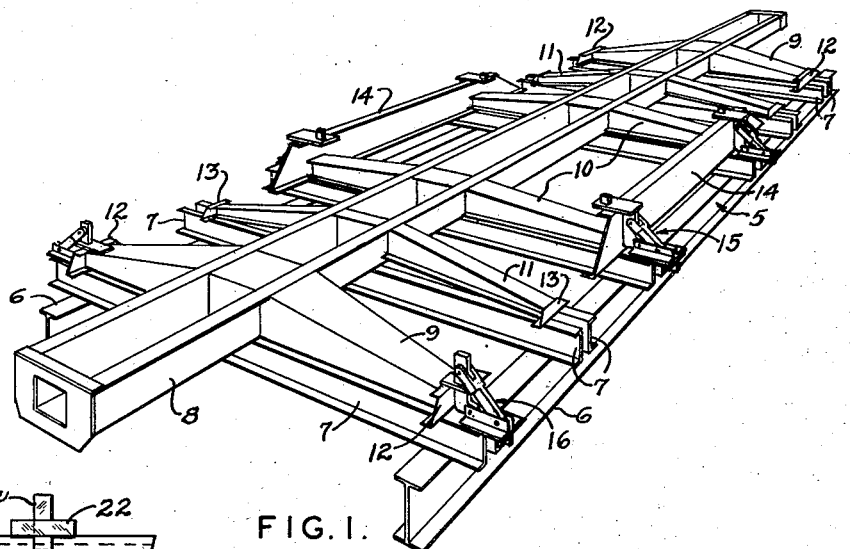
Fig. 1 shows a car underframe in position on an assembly jig or table provided with the clamps which are the subject of this invention.
Figure 3:
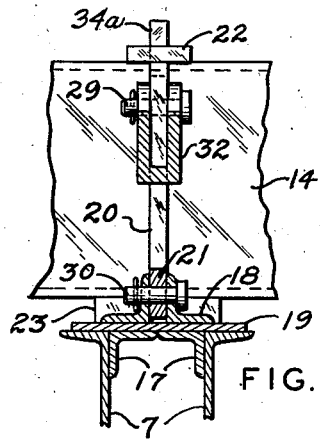
Fig. 3 is a section on line 3—3 of Fig. 2.

Referring to Fig. 1, the numeral 5 indicates a jig for the assembly of railway car underframes. The assembly bed or table of the jig includes at least two parallel, spaced stringers 6, which support a plurality of spaced transverse members 7. Stringers 6 are of substantially the same length as the center sill which is to be used in the car underframe. Transverse members 7 are channels, slightly longer than the underframe transverse members; they are arranged and secured to the upper surface of stringers 6 in spaced pairs with their web portions vertical, and flanges outward. The spacing is such that a pair of members 7 will be under each transverse member of the underframe when the underframe is positioned on the jig for assembly. Transverse members 7 act as a support for the elements which compose the underframe. A center sill 8 of standard design is set up on assembly jig 5. Body bolsters 9 are positioned for welding to center sill 8 near its ends. Between body bolsters 9, additional transverse members, crossbearers 10 and crossties 11 are positioned on the assembly jig 5 for welding to the center sill 8 at spaced intervals.

The numerals 12 and 13 refer to side sill connectors of channel and angle cross section, respectively, which are positioned to be secured by welding to the end surfaces of bolsters 9 and crossties 11, respectively. Side sill reinforcements 14 of channel form are positioned to be secured to the end surfaces of intermediate crossbearers 10. Clamps 15 and 16 are mounted on the ends of transverse members 7 to hold side sill reinforcement channels 14 and side sill supports 12 and 13, respectively, against the end surfaces of crossbearers 10, bolsters 9, and crossties 11, for welding thereto. A detailed description of clamps 15 and 16 follows.

Figure 2:
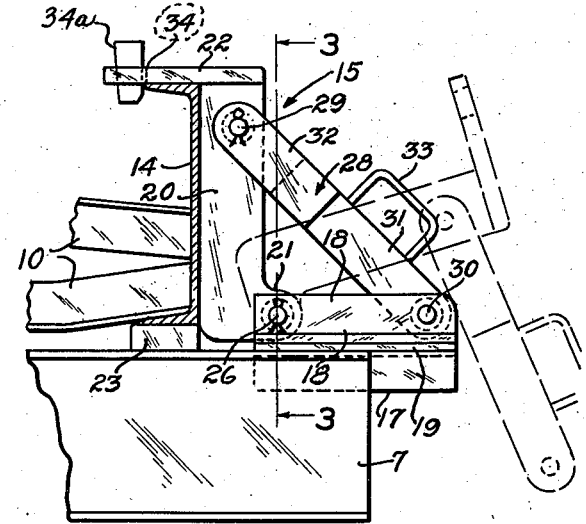
Fig. 2 is an enlarged view of one of the clamps in operative position.

Referring now to Fig. 2, side sill reinforcement clamp 15 is shown in enlarged view in operative position, resting on and secured to the upper surface of the upper flanges of a pair of transverse members 7. Abutting the lower left hand corner of clamp 15 a block 23 rests upon and is secured to transverse members 7. Block 23 provides a support for reinforcement channel 14 which rests on the upper surface of the block. The end of crossbearer 10 abuts the upper surface of the lower flange and the inner surface of the web of channel 14 and it is desired that these abutting surfaces be secured to each other by a welding process. The purpose of clamp 15 is to hold channel member 14 in the correct relation with crossbearer 10 for welding.

Clamp 15 includes a base plate 19 to the lower surface of which are welded angle members 17. The top flanges of these angle members extend together and their vertical legs are parallel to each other and spaced so that their outer surfaces fit snugly between and are welded to the inner surfaces of paired channel members 7 of the jig bed. Additional angle members 18 are welded to the upper surface of base plate 16 with their upwardly extending flanges parallel and slightly spaced apart. Thus, members 17, 18, and 19 form rigid parts of the jig bed. The vertical leg 20 of the clamp consists essentially of a flat, rectangular bar with a lug 21 at the lower end and with a horizontal ledge member 22 extending in the opposite direction at the upper end and, conveniently, welded to leg 20. The edge of lug 21 is tangential to the lower end of leb 20 and the opposite, lower corner of the leg is rounded for a purpose to be described. Lug 21 is interposed between the upstanding flanges of angles 18 and is pivotally connected thereto by a pin 26 retained in position by a cotter key which passes through a small, diametral hole in the pin. A diagonal brace 28 is pinned to leg 20 and angles 18, as at 29 and 30. The brace is formed of a bar 31, at one end, which is received between the upright flanges of angles 18, and bifurcations 32 at the other end which embrace vertical leg 20. An inverted, U-shaped hand grip 33 is welded to bar 31. The brace, leg 20, and angle 18 are drilled so as to form a right triangle when free fittings pivot pins 29 and 30 are inserted.

Ledge member 22 at the upper end of leg 20 is flat and substantially rectangular and is disposed so that its long dimension is parallel to the flat sides of vertical leg 20 and its major surfaces are substantially horizontal. The free end of the plate member is vertically pierced by an elongated opening 34. The distance of the inner edge of opening 34 from vertical leg 20 is somewhat less than the flange width of underframe channel 14. A wedge 34a is provided for insertion through opening 34.

Operation of clamping portion 15 of the jig is as follows:

Initially, pin 30 is withdrawn, releasing the connection between diagonal brace 28 and angle members 18 and permitting vertical leg 20 to swivel to the broken line, inoperative position of Fig. 2. The component parts of the underframe are assembled on the jig bed with channel member 14 abutting the ends of crossbearers 10 and supported on block 23. With the aid of hand grip 33, vertical leg 20 is rotated until its inner edge bears against the outer surface of channel member 14. Pin 30 is driven in place to lock the diagonal brace and wedge 34a is thereupon inserted in opening 34 and is driven downwardly behind the flange of channel 14 so as to secure the channel in the proper position for welding to crossbearer 10. Upon conclusion of the welding process, wedge 34a is knocked out and pin 30 withdrawn. With the aid of hand grip 33, bracket leg 20 is again rotated to its inoperative position, the rounded lower corner of the leg facilitating this movement.

Figure 4:
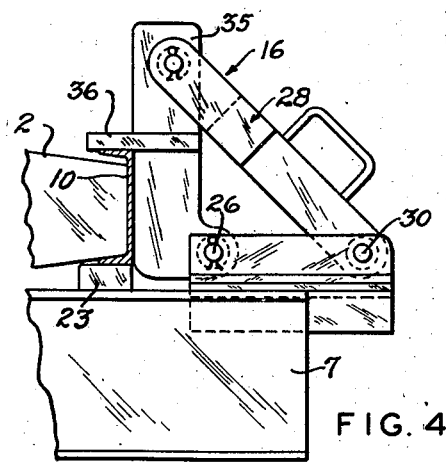
Fig. 4 is similar to Fig. 2 and showing another clamp in operative position.

Referring now to Fig. 4, it will be seen that clamp 16 at bolster 9 is identical to clamp 15, except for the design of the vertical leg portion. Since clamp 16 is designed to hold a relatively shallow channel member 12 for welding to bolster 9, its vertical leg 35 differs in design from vertical leg 20 of clamp 15 in that, instead of pierced top ledge 22, vertical leg 35 has a ledge element 36 welded thereto mediately of its height and extending inwardly at a right angle.

Clamp 16 is applied similarly to clamp 15; after the underframe parts have been positioned on assembly jig 5, vertical leg 35 is rotated about pivot pin 26 until it abuts the outer surface of channel member 12 and ledge 36 rests on the upper flange of the channel member. Pin 30 is driven, as before, securing brace 28 to stabilize the channel on the assembly bed for welding to the end of the bolster. On completion of the welding process, pin 30 is removed and vertical leg 35 may be swung out of the way, thereby permitting removal of the assembled underframe from the jig.

Other parts of the underframe are secured together in any suitable or previously known manner. The invention may be modified in various respects as will occur to those skilled in the art and the exclusive use of all modifications as come within the scope of the appended claims is contemplated.

I claim:

1. In combination with a jig for assembling freight car underframes, said jig comprising a plurality of longitudinal stringer members and a plurality of transverse members resting upon and secured to said stringer members, clamps for securing the side elements of said underframe to said assembly jig, said clamps comprising a horizontal base member for attachment to said transverse members, a vertical leg member pivotally connected at its lower end to said horizontal base member for rotation in a vertical plane parallel to said transverse members, a horizontal ledge member formed on said vertical leg member at the same height as the underframe side members, said vertical leg member being formed with a straight edge adapted to abut against the vertical portion of side members of the underframe and a diagonal brace member pivotally connected to said vertical leg member and detachably connected to said horizontal base member.

2. In a jig for assembling freight car underframes, a rectangular bed for aligning and supporting the component elements of said underframes, said underframe elements including a longitudinal center sill supported lengthwise on said bed, a plurality of spaced transverse members, and longitudinal side members abutting the outer ends of said transverse members, a clamp for securely positioning said longitudinal side members against said transverse members for welding thereto, said clamp comprising a horizontal base member secured to said bed adjacent and normal to a side thereof, a normally vertical leg member pivotally connected at its lower end to the inner end portion of said horizontal base member for rotation in a vertical plane normal to said longitudinal side members, a horizontal ledge member being formed on said vertical leg at substantially the same height as the upper surface of said longitudinal side members, said vertical leg member being formed with a straight edge adapted to abut against the vertical portion of said longitudinal side members, and a diagonal brace member pivotally connected to the upper end portion of said vertical leg member and detachably connected to the outer end portion of said horizontal base member to permit rotation of said vertical leg member to a horizontal position for insertion of the underframe elements and removal of the assembled underframe.

TOLBOTT G. SHIPLEY.

REFERENCES CITED

The following references are of record in the file of this patent:

UNITED STATES PATENTS

| Number | Name | Date |
|---|---|---|
| 524,330 | Lane | Aug. 14, 1894 |
| 1,382,102 | Lukaszewski | June 21, 1921 |
| 2,304,493 | Bullock | Dec. 8, 1942 |